US010434924B2

(12) United States Patent
Alfaro et al.

(10) Patent No.: US 10,434,924 B2
(45) Date of Patent: Oct. 8, 2019

(54) FREE RANGING AUTOMATED GUIDED VEHICLE AND OPERATIONAL SYSTEM

(71) Applicant: Dematic Corp., Grand Rapids, MI (US)

(72) Inventors: Rene D. Alfaro, Rockford, MI (US); Mark D. O'Brien, Kentwood, MI (US); Matthew Geldersma, Belding, MI (US); Riju Kuruvila, Grand Rapids, MI (US); David M. Berghorn, Waterford, MI (US); Michael S. Khodl, Ada, MI (US); David M. Grasch, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 31 days.

(21) Appl. No.: 15/699,275

(22) Filed: Sep. 8, 2017

(65) Prior Publication Data
US 2018/0072212 A1 Mar. 15, 2018

Related U.S. Application Data

(60) Provisional application No. 62/385,587, filed on Sep. 9, 2016.

(51) Int. Cl.
*B60P 1/64* (2006.01)
*B60G 3/08* (2006.01)
(Continued)

(52) U.S. Cl.
CPC ............... *B60P 1/64* (2013.01); *B60G 3/08* (2013.01); *B60K 1/02* (2013.01); *B60K 7/0007* (2013.01);
(Continued)

(58) Field of Classification Search
CPC .......... B60G 3/08; B60K 1/02; B60K 7/0007; B60P 1/48; B60P 1/52; G05D 1/0212; G05D 1/024; G05D 1/0278
(Continued)

(56) References Cited

U.S. PATENT DOCUMENTS

| 3,172,496 A | 3/1965 | Rabinow et al. |
| 4,811,229 A | 3/1989 | Wilson |

(Continued)

FOREIGN PATENT DOCUMENTS

| EP | 1752850 A2 | 2/2007 |
| WO | WO2005077240 | 8/2005 |

(Continued)

OTHER PUBLICATIONS

International Search Report of the International Searching Authority from corresponding Patent Cooperation Treaty (PCT) Application No. PCT/IB17/55441, indicated completed on Jan. 29, 2018.

(Continued)

*Primary Examiner* — Maceeh Anwari
(74) *Attorney, Agent, or Firm* — Gardner, Linn, Burkhart & Ondersma LLP

(57) ABSTRACT

An automated guided vehicle (AGV) that is configured to operate with a navigation and guidance system includes a base frame structure that supports a material handling apparatus. Casters may be attached at peripheral portions of the base frame structure to movably support the base frame structure away from a ground surface. Drive wheel assemblies may be disposed between two of the casters and configured to propel and steer the AGV. A suspension system may have intersecting swing arms that are pivotally mounted at the base frame structure and independently attach at each of the drive wheel assemblies. The suspension system biases the drive wheel assemblies against the ground surface to maintain friction of the drive wheel assemblies against the ground surface, such as for traversing sloped or uneven surfaces.

36 Claims, 14 Drawing Sheets

(51) Int. Cl.
*B60K 1/02* (2006.01)
*B60K 7/00* (2006.01)
*B60P 1/48* (2006.01)
*B60P 1/52* (2006.01)
*G05D 1/02* (2006.01)
*B66C 11/00* (2006.01)
*B66F 9/06* (2006.01)

(52) U.S. Cl.
CPC ............... *B60P 1/48* (2013.01); *B60P 1/52* (2013.01); *B66C 11/00* (2013.01); *B66F 9/063* (2013.01); *G05D 1/024* (2013.01); *G05D 1/0212* (2013.01); *G05D 1/0278* (2013.01); *B60G 2200/154* (2013.01); *B60G 2202/152* (2013.01); *B60K 2007/0038* (2013.01); *B60K 2007/0076* (2013.01); *B60Y 2200/49* (2013.01); *B60Y 2400/85* (2013.01); *G05D 2201/0216* (2013.01)

(58) Field of Classification Search
USPC ............................................................. 701/26
See application file for complete search history.

(56) References Cited

U.S. PATENT DOCUMENTS

| | | | |
|---|---|---|---|
| 5,023,790 A | 6/1991 | Luke, Jr. | |
| 5,199,524 A | 4/1993 | Ivancic | |
| 5,764,014 A | 6/1998 | Jakeway et al. | |
| 5,988,306 A | 11/1999 | Ooishi | |
| 6,345,217 B1 | 2/2002 | Zeitler et al. | |
| 6,469,466 B1 | 10/2002 | Suzuki | |
| 7,213,663 B2 | 5/2007 | Kim | |
| 7,456,596 B2 | 11/2008 | Goodall et al. | |
| 7,866,671 B2 | 1/2011 | Madler | |
| 7,914,020 B2 | 3/2011 | Boston | |
| 8,417,383 B2 | 4/2013 | Ozick et al. | |
| 8,696,010 B2 | 4/2014 | Toebes et al. | |
| 8,706,394 B2 | 4/2014 | Trepagnier et al. | |
| 8,726,454 B2 | 5/2014 | Gilbert, Jr. et al. | |
| 8,954,188 B2 | 2/2015 | Sullivan et al. | |
| 8,965,619 B2 | 2/2015 | Sullivan et al. | |
| 9,156,394 B2 | 10/2015 | Toebes et al. | |
| 9,187,244 B2 | 11/2015 | Toebes et al. | |
| 9,242,800 B2 | 1/2016 | Sullivan et al. | |
| 9,278,690 B2 | 3/2016 | Smith | |
| 9,309,050 B2 | 4/2016 | Toebes et al. | |
| 9,317,038 B2 | 4/2016 | Ozick et al. | |
| 9,320,398 B2 | 4/2016 | Hussey et al. | |
| 9,321,591 B2 | 4/2016 | Lert et al. | |
| 9,327,407 B2 | 5/2016 | Jones et al. | |
| 9,327,903 B2 | 5/2016 | Toebes et al. | |
| 9,359,005 B2 | 6/2016 | Doan et al. | |
| 9,423,796 B2 | 8/2016 | Sullivan et al. | |
| 9,454,508 B2 | 9/2016 | Yu et al. | |
| 9,499,338 B2 | 11/2016 | Toebes et al. | |
| 9,517,885 B2 | 12/2016 | Sullivan et al. | |
| 9,519,882 B2 | 12/2016 | Galluzzo et al. | |
| 9,550,225 B2 | 1/2017 | Sullivan et al. | |
| 9,561,905 B2 | 2/2017 | Toebes et al. | |
| 2004/0042885 A1 | 3/2004 | Rokkaku | |
| 2004/0074685 A1 | 4/2004 | Tham | |
| 2005/0021195 A1 | 1/2005 | Zeitler et al. | |
| 2007/0151780 A1 | 7/2007 | Tonoli et al. | |
| 2010/0266381 A1* | 10/2010 | Chilson | B66F 9/063 414/809 |
| 2010/0316468 A1* | 12/2010 | Lert | B65G 1/045 414/273 |
| 2012/0159803 A1 | 6/2012 | Van Veen et al. | |
| 2012/0303190 A1 | 11/2012 | Pfeiffer | |
| 2013/0340201 A1 | 12/2013 | Jang et al. | |
| 2016/0137416 A1 | 5/2016 | Toebes et al. | |
| 2016/0167226 A1 | 6/2016 | Schittman | |
| 2016/0231746 A1 | 8/2016 | Hazelton et al. | |
| 2016/0231751 A1 | 8/2016 | Mecklinger et al. | |
| 2016/0236866 A1 | 8/2016 | Sullivan et al. | |
| 2016/0244261 A1 | 8/2016 | Sullivan et al. | |
| 2016/0278599 A1 | 9/2016 | Seo et al. | |
| 2017/0001311 A1 | 1/2017 | Bushman et al. | |
| 2017/0080886 A1 | 3/2017 | Kuga et al. | |
| 2017/0088354 A1 | 3/2017 | Sullivan et al. | |
| 2017/0111453 A1 | 4/2017 | Hassan | |
| 2017/0113874 A1 | 4/2017 | Sullivan et al. | |
| 2017/0131720 A1 | 5/2017 | Sullivan et al. | |

FOREIGN PATENT DOCUMENTS

| | | |
|---|---|---|
| WO | 2015145803 A1 | 10/2015 |
| WO | WO2016126626 | 8/2016 |
| WO | WO2017004524 | 1/2017 |

OTHER PUBLICATIONS

Written Opinion of the International Searching Authority from corresponding Patent Cooperation Treaty (PCT) Application No. PCT/IB17/55441, indicated completed on Jan. 29, 2018.

Preliminary Report on Patentability of the International Searching Authority from corresponding Patent Cooperation Treaty (PCT) Application No. PCT/IB2017/055441, completed Mar. 12, 2019.

* cited by examiner

US 10,434,924 B2

FREE RANGING AUTOMATED GUIDED VEHICLE AND OPERATIONAL SYSTEM

CROSS-REFERENCE TO RELATED APPLICATION

This application claims benefit and priority under 35 U.S.C. § 119(e) of U.S. provisional application Ser. No. 62/385,587, filed Sep. 9, 2016, which is hereby incorporated herein by reference in its entirety.

FIELD OF THE INVENTION

The present invention generally relates to automated guided vehicles, and more particularly to structural and operational systems of an automated guided vehicle, such as a suspension system, sensor system, navigation and guidance system, and the like.

BACKGROUND OF THE INVENTION

Automatic guided vehicles, often referred to as AGVs, are usually driverless vehicles that are often used for material handling purposes. AGVs are capable of carrying or towing material or articles from one point to another without the need for a driver on the vehicle. AGVs are typically capable of driving themselves from a first location to a second location, such as by using navigational sensors to determine their position and heading. This position and heading information may be used by the vehicle in order for it to automatically steer itself along a desired path or toward a desired destination. The navigational sensors may include gyroscopes, sensors for detecting magnets embedded in the floor, laser reflectors, wheel encoders, transponder sensors, and a variety of other types of sensors. It is relatively common for these AGVs to be used in warehouses and material handling centers, where workers are commonly walking between stations or areas in the vicinity or alongside the AGVs.

SUMMARY OF THE PRESENT INVENTION

According to one aspect of the present invention, an automated guided vehicle (AGV) that is configured to operate with a navigation and guidance system includes a base frame structure that may support a material handling apparatus. A plurality of support wheel assemblies are attached at peripheral portions of the base frame and are configured to movably support the base frame away from a ground surface. A pair of drive wheel assemblies are disposed between at least two of the plurality of support wheel assemblies and are configured to propel the AGV over the ground surface. A suspension system is provided that has intersecting swing arms that pivotally mount at the base frame and independently attach at each of the drive wheel assemblies. The suspension system biases the pair of drive wheel assemblies against the ground surface to maintain friction of the drive wheel assemblies against the ground surface.

According to another aspect of the present invention, a method of propelling an AGV over a ground surface includes a base frame that has a plurality of support wheels attached at peripheral portions of the base frame and that are configured to movably support the base frame away from the ground surface. A pair of drive wheels that are disposed between at least two of the plurality of support wheels engage the ground surface and rotate to propel the AGV. The drive wheels are biased against the ground surface with a suspension system that has intersecting swing arms pivotally mount at the base frame and independently support each of the drive wheels. A biasing downward force of the suspension system is configured to maintain friction of the drive wheels against the ground surface.

According to yet another aspect of the present invention, a drive wheel suspension assembly is provided for an AGV that has a base frame supported by a plurality of support wheels. The drive wheel suspension assembly includes first and second drive wheels spaced apart and configured to be disposed between at least two of the plurality of support wheels for propelling the AGV over a ground surface. The drive wheel suspension assembly also includes first and second swing arms that intersect and attach at the drive wheel assemblies. The first and second swing arms are pivotally mounted at the base frame to bias the first and second drive wheels against the ground surface to maintain friction.

According to another aspect of the present invention, an automated guided vehicle (AGV) includes a base frame that has an upper portion configured to support a material handling apparatus and a propulsion system adapted to propel the base frame. First and second directional sensors are disposed at opposing ends of the base frame and at least one is operable to emit a sensor field within at least one slot that is disposed between the upper portion and a lower portion of the base frame. The sensor fields of the first and second directional sensors each comprise coverage of at least 180 degrees in a substantially horizontal plane and are arranged to provide a combined sensor field substantially surrounding the AGV.

According to yet another aspect of the present invention, a method of operating an AGV includes providing a base frame that has an upper portion configured to support a material handling apparatus and a lower portion supported by a plurality of wheel assemblies that are configured to support the base frame away from a ground surface. The base frame is moved over the ground surface to a desired location with a propulsion system that uses at least one of the plurality of wheel assemblies. A perimeter sensory field surrounding the base frame is monitored with two directional sensors that are disposed at opposing ends of the base frame. The two directional sensors are each operable to emit a sensor field within at least one slot that is disposed at support members extending between the upper and lower portions of the base frame.

According to another aspect of the present invention, a robotic picking system includes an AGV that has a base frame, a propulsion system, and an AGV control that comprises a navigation and guidance system. A robotic picking arm is mounted to the base frame and a robotic control controls movement of the robotic picking arm. The AGV control and the robotic control are substantially autonomous.

These and other objects, advantages, purposes, and features of the present invention will become apparent upon review of the following specification in conjunction with the drawings.

DETAILED DESCRIPTION OF EMBODIMENTS

Figure 1:
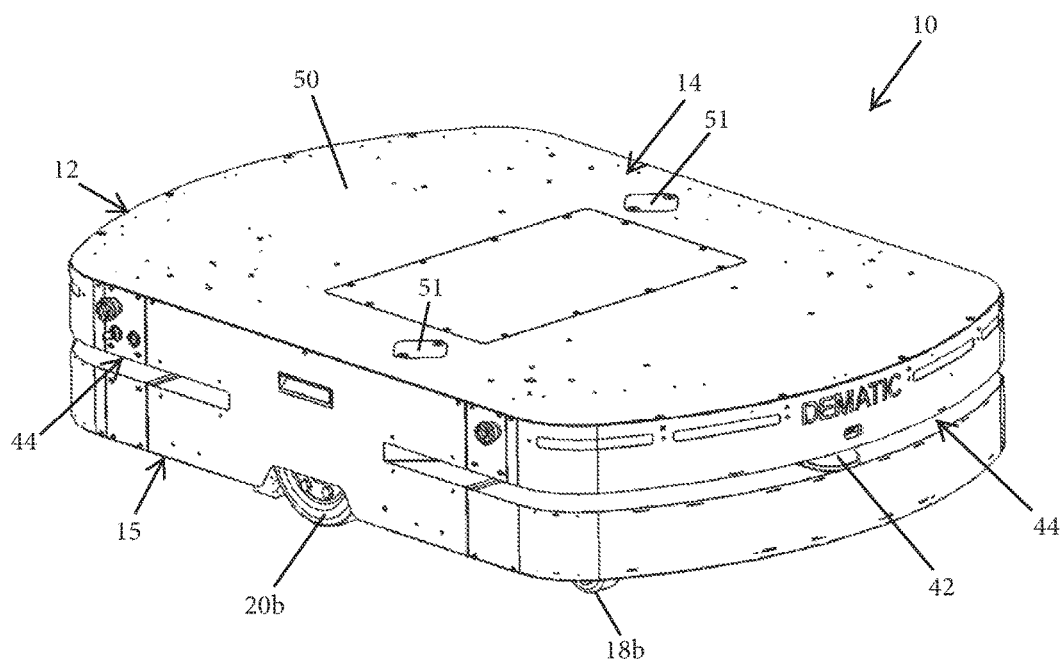
FIG. 1 is an upper perspective view of an automated guided vehicle, in accordance with an embodiment of the present invention.
Figure 2:
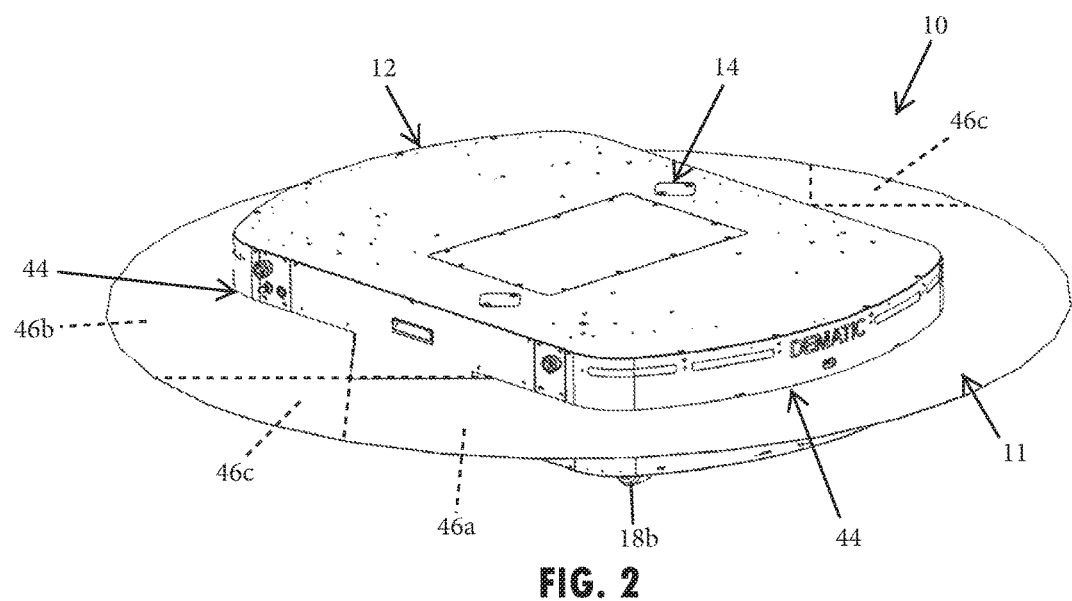
FIG. 2 is an upper perspective view of the automated guided vehicle shown in FIG. 1 with overlapping sensory fields shown surrounding the vehicle.
Figure 3:
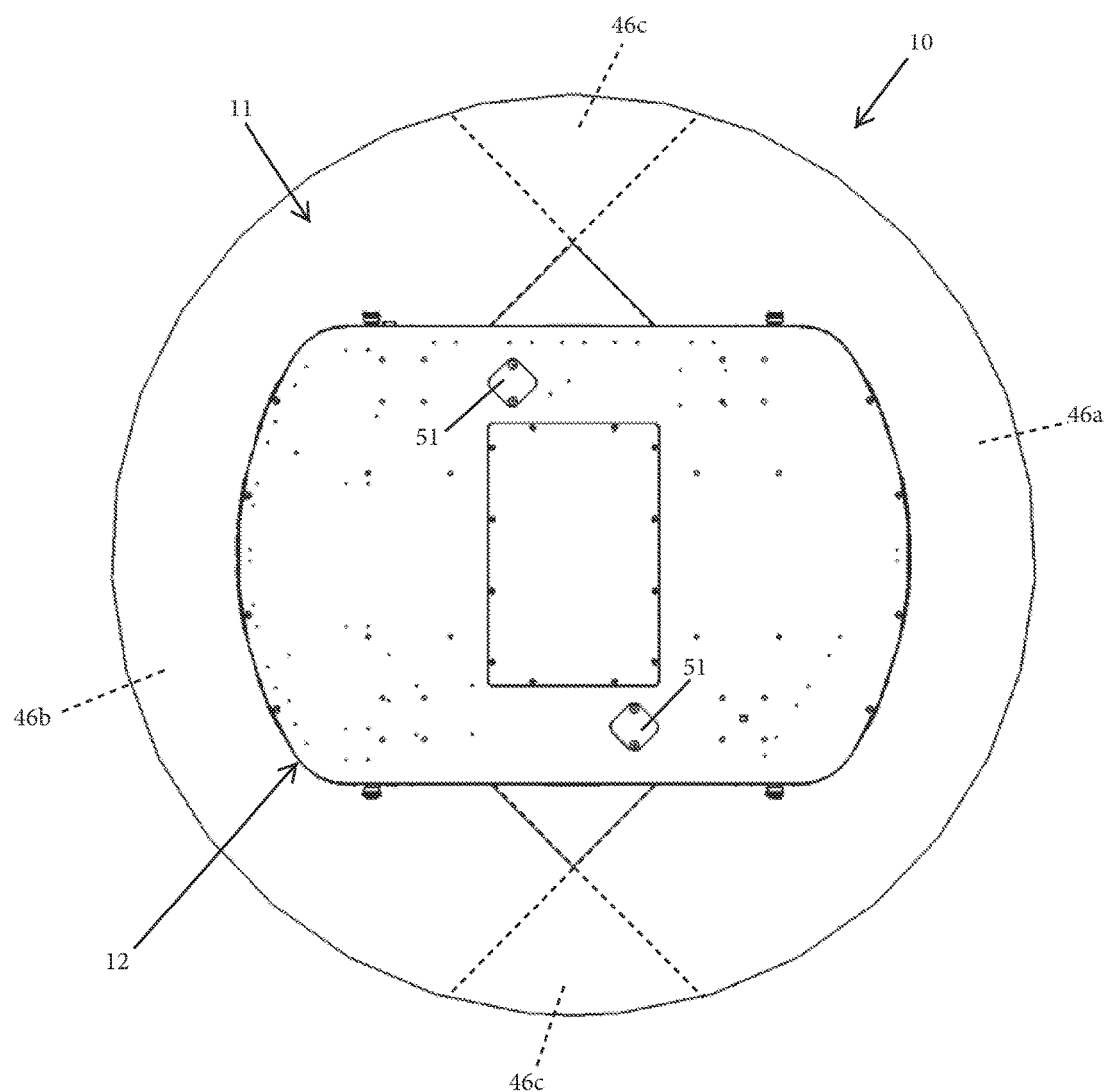
FIG. 3 is a top plan view of the automated guided vehicle and surrounding sensory fields shown in FIG. 2.
Figure 4:
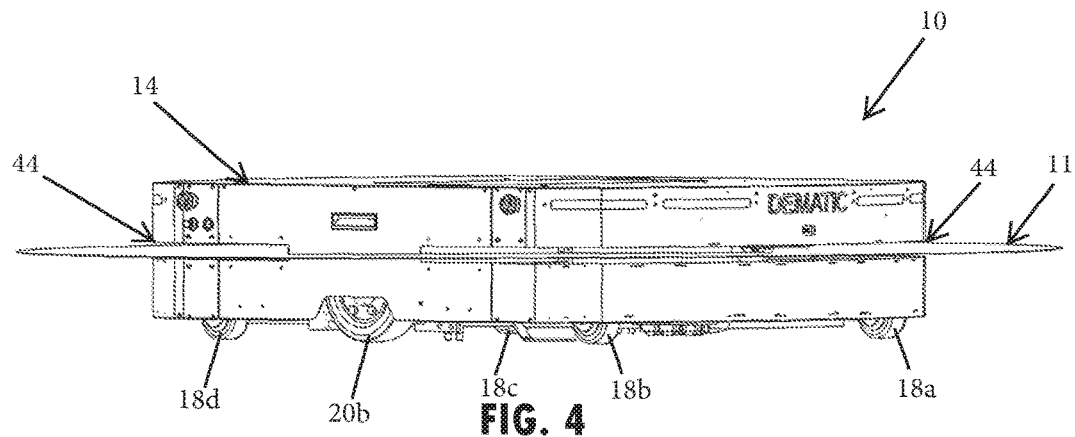
FIG. 4 is a side perspective view of the automated guided vehicle and surrounding sensory fields shown in FIG. 2.
Figure 5:
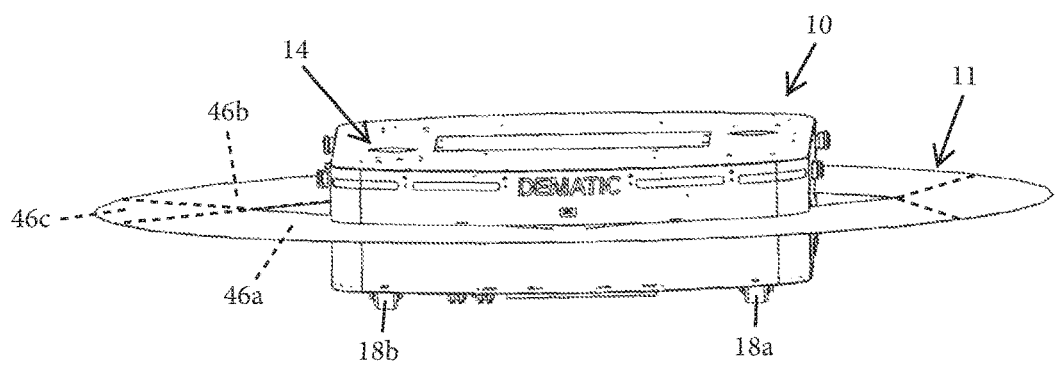
FIG. 5 is an end perspective view of the automated guided vehicle and surrounding sensory fields shown in FIG. 2.
Figure 6:
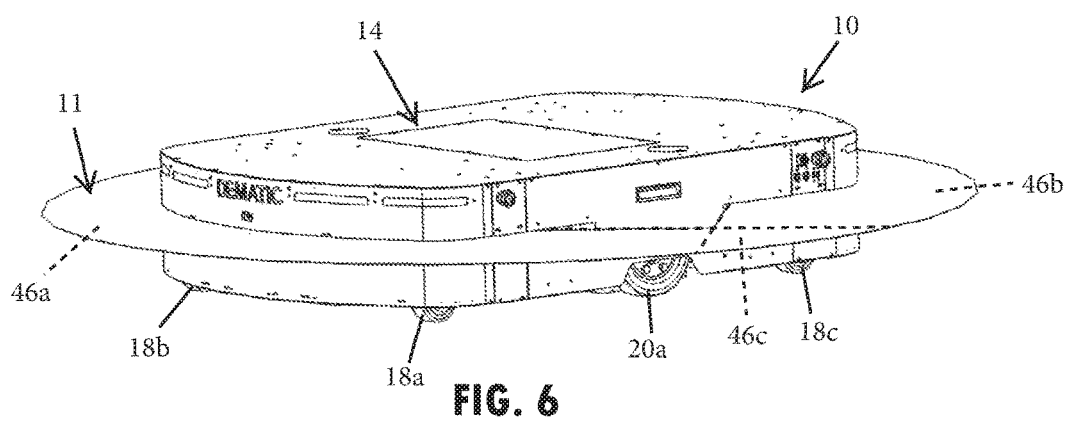
FIG. 6 is another perspective view of the automated guided vehicle and surrounding sensory fields shown in FIG. 2.
Figure 7:
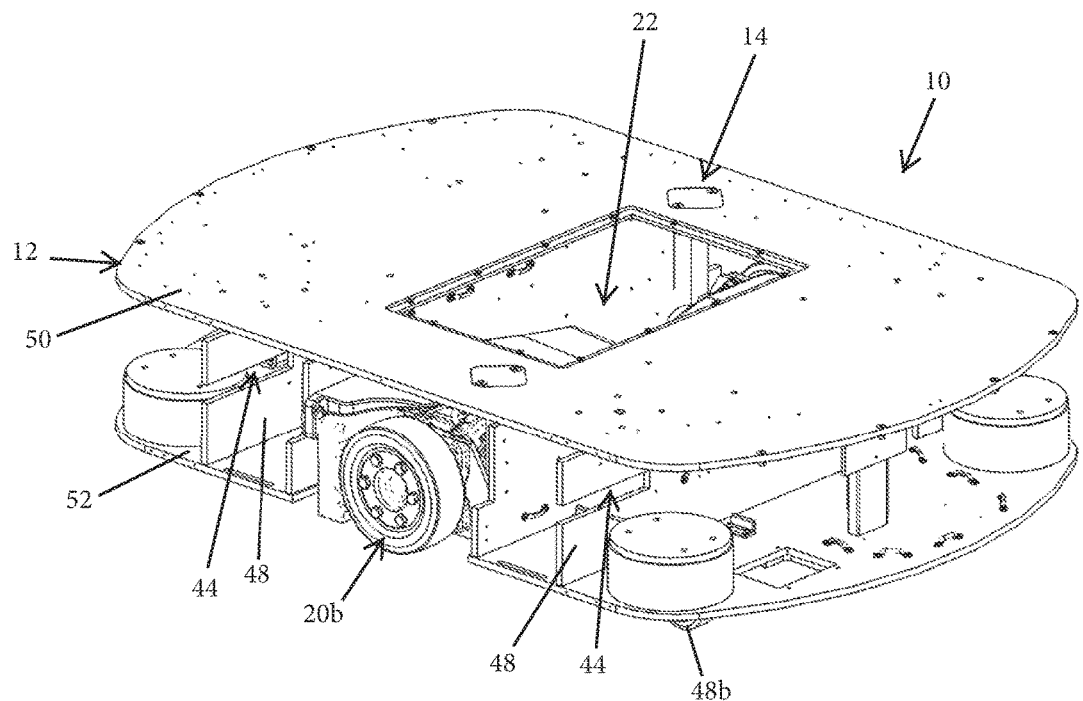
FIG. 7 is an upper perspective view of the automated guided vehicle of FIG. 1, having internal components and a side panel portion and a deck portion of the vehicle body removed.
Figure 8:
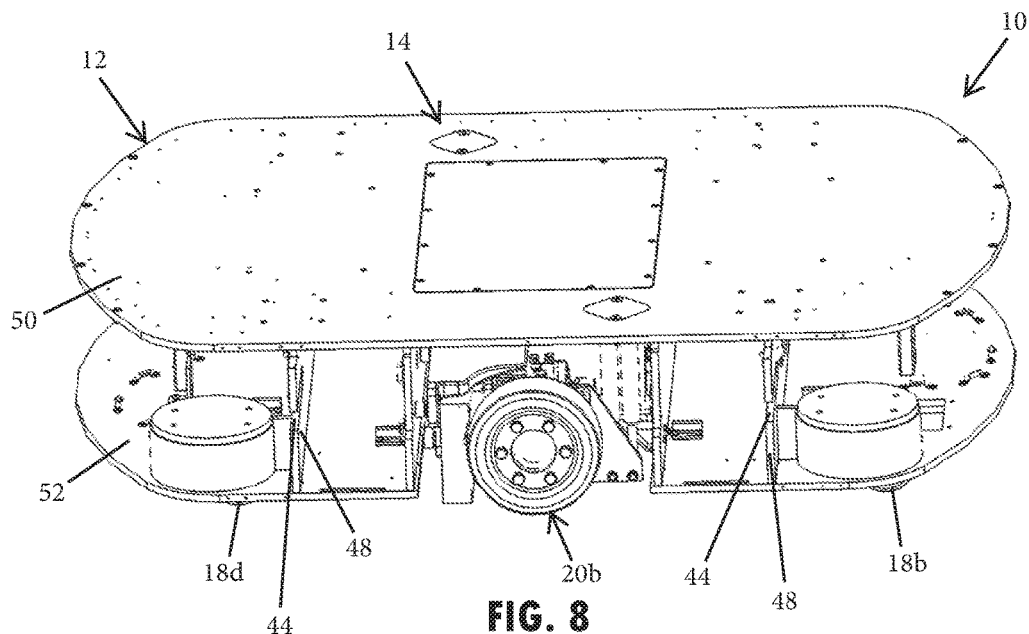
FIG. 8 is a side upper perspective view of the automated guided vehicle shown in FIG. 7.
Figure 9:
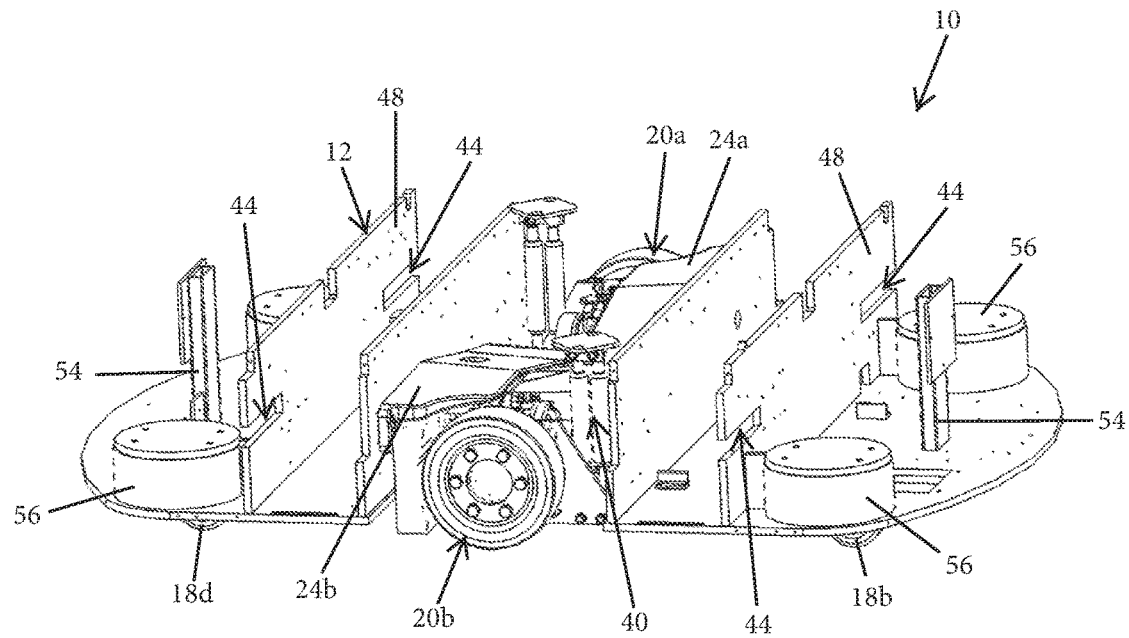
FIG. 9 is a side elevational view of the automated guided vehicle shown in FIG. 7.
Figure 10:
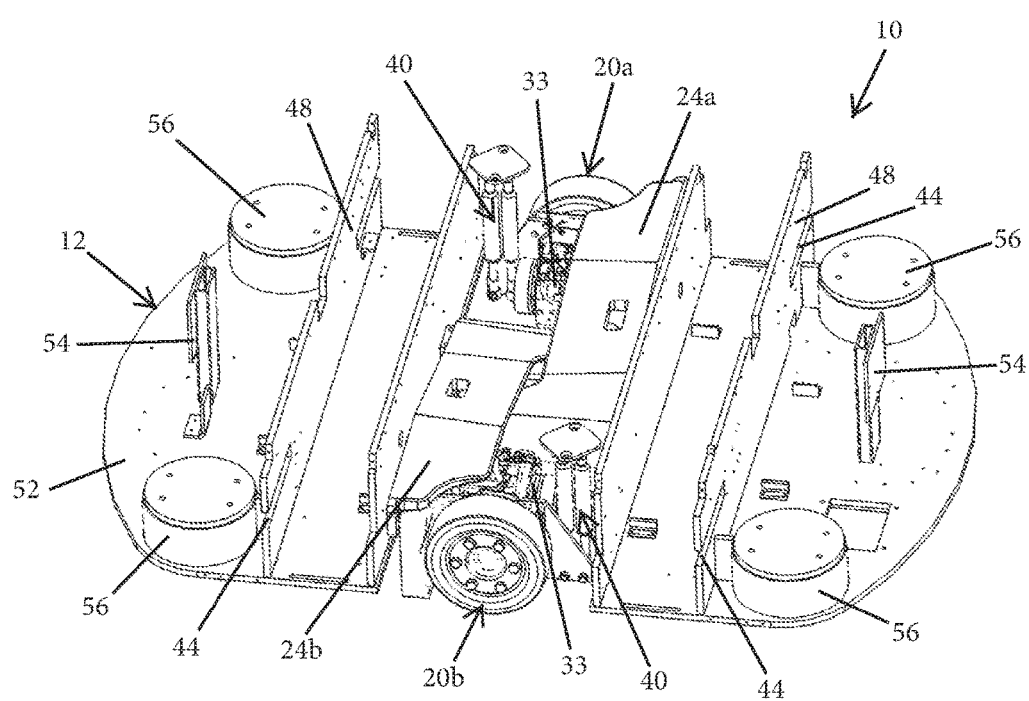
FIG. 10 is a bottom plan view of the automated guided vehicle shown in FIG. 7.
Figure 11:
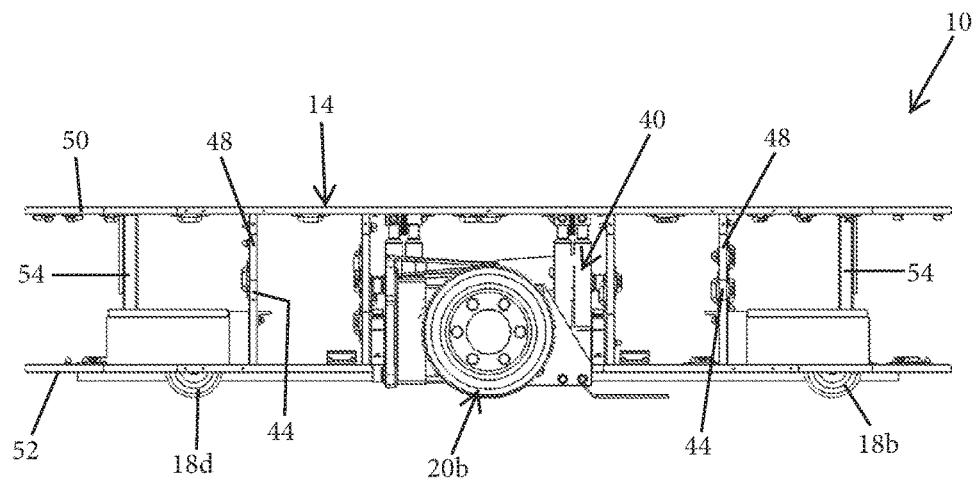
FIG. 11 is an upper perspective view of the automated guided vehicle of FIG. 1, having internal components and side and upper portions of the vehicle body removed.

Referring now to the drawings and the illustrative embodiments depicted therein, an automated guided vehicle (AGV) 10, 110 is shown that has a self-propulsion system that may operate with a navigation and guidance system, such as to follow a desired path and/or reach a desired destination in a material handling environment without any physical restraints, such as wires or tracks or the like. The AGV 10 is shown with a base frame structure 12 having an upper portion or surface 14 that is configured to support a material handling apparatus, such as a powered roller conveyor 16 (FIGS. 16-19), a robotic arm 116 (FIGS. 20-22), a lift unit, or other conceivable device or attachment or combinations thereof. The AGV may also have a peripheral sensory system that is utilized to monitor the peripheral area or sensory field 11 (FIGS. 2-6) surrounding the AGV for positional and locational control of the AGV and/or for object detection. Thus, the AGV may establish a preferred guide-path and control the propulsion system to travel along the preferred guide-path, and may also detect an obstacle on the guide-path, so to avoid the obstacle and determine a detour path around the obstacle that returns the AGV to the preferred guide-path. The peripheral sensory system may also or alternatively operate in cooperation with the material handling apparatus supported by the AGV, such as to prevent a robotic arm from undesirably contacting an object detected in the peripheral area surrounding the AGV.

Figure 12:
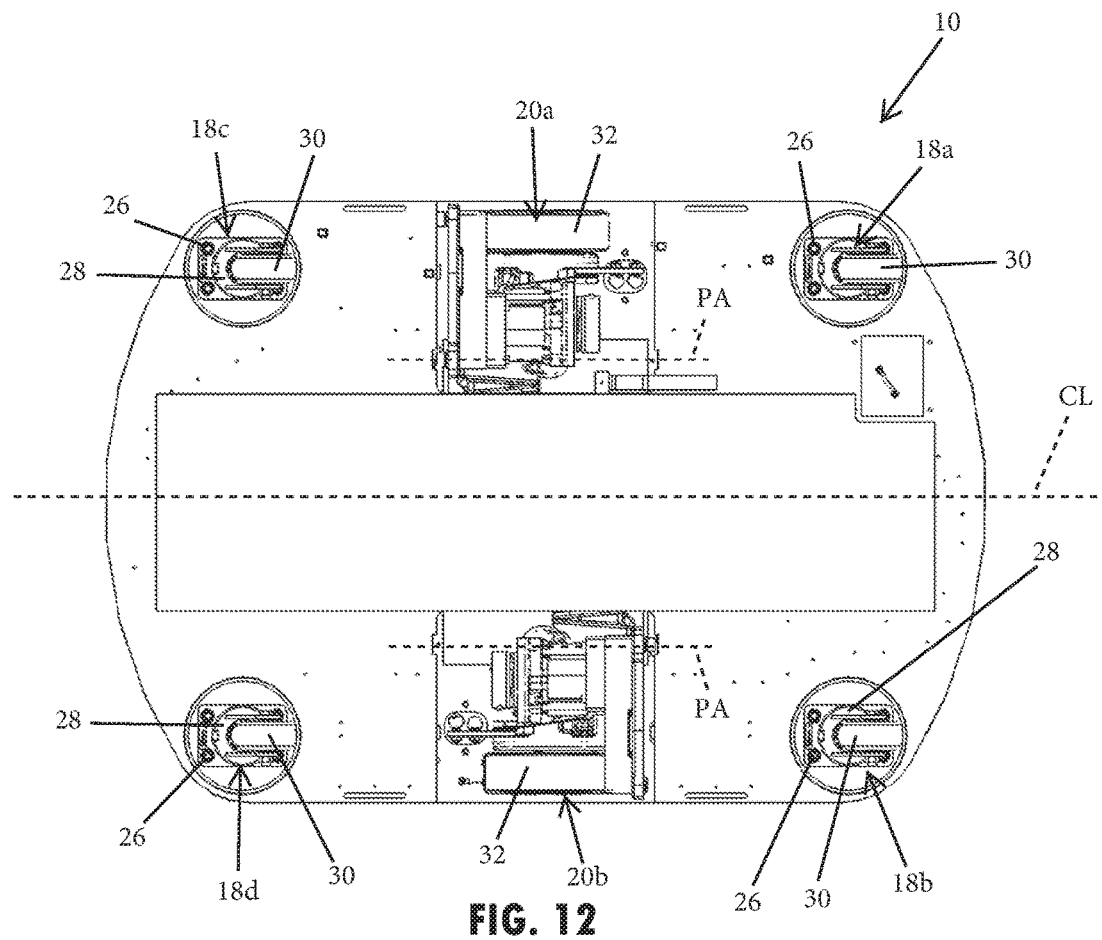
FIG. 12 is another perspective view of the automated guided vehicle shown in FIG. 11.
Figure 13:
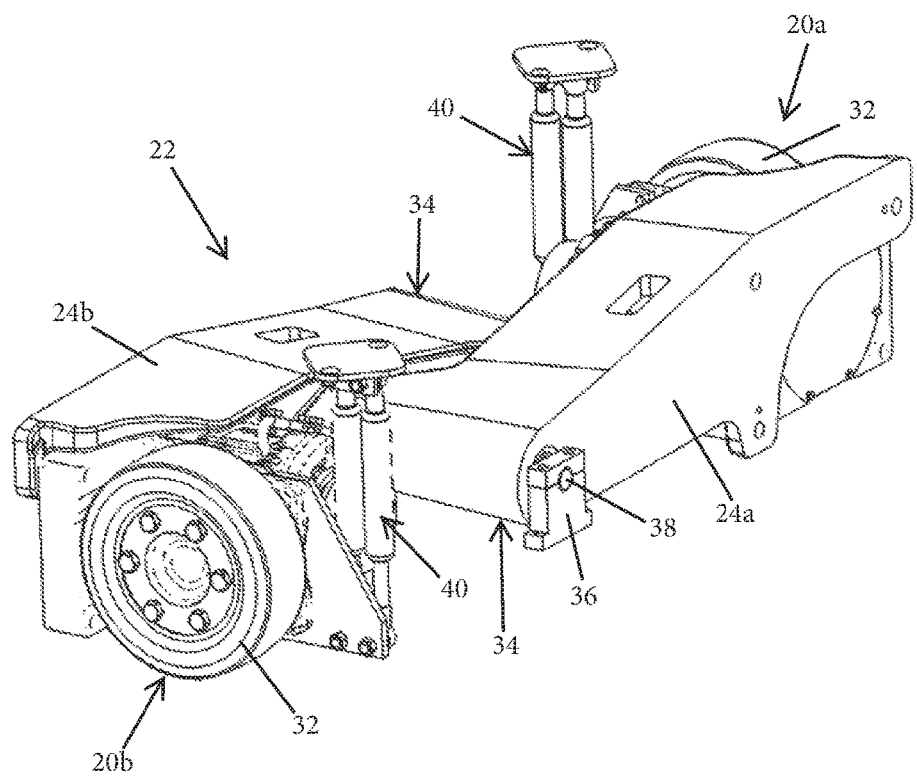
FIG. 13 is a perspective view of a suspension system and wheel assemblies of the automated guided vehicle of FIG. 1.

To support the loads carried by the AGV 10 and the frame structure 12 of the AGV itself, freely rotating support members may be attached at peripheral portions of the base frame structure 12. The freely rotating support members may be support wheel assemblies, such as shown with four casters 18a, 18b, 18c, 18d attached at the corner portions of the base frame structure 12. The casters are configured to movably support the base frame structure 12 away from a ground surface and generally support the weight of the AGV 10 and any loaded material or item or the like. Also, the casters may generally support the base structure 12 in a generally level orientation. As shown in FIG. 12, the casters 18a, 18b, 18c, 18d may each have an upper bracket 26 that is fixedly attaches directly to the base frame structure 12 and a lower bracket 28 that freely swivels or pivots about a generally vertical axis, where a wheel 30 of each caster is rotatably attached to the lower bracket 28 so as to permit the wheel 30 to freely rotate about a generally horizontal axis. Thus, the casters may generally support the entire weight of the AGV and its contents, such that it is contemplated that more or fewer casters may be used on the AGV to accommodate the size and desired load capacity of the specific AGV. It is also contemplated that the casters may optionally include encoders to monitor movement of the AGV, also known as odometry.

To move or otherwise propel the AGV 10 relative to the ground surface, a propulsion system may be provided that has at least one drive wheel assembly disposed between at least two of the freely rotating support members. As shown in FIG. 12, the propulsion system includes two drive wheel assemblies 20a, 20b that are disposed at the lateral sides of the AGV 10 and are generally centered between the two front casters 18a, 18b and the two rear casters 18c, 18d. As such, the drive wheel assemblies 20a, 20b space the respective drive wheels 32 of the drive wheel assemblies 20a, 20b laterally apart from each other at or near the peripheral edges of the base frame structure. The drive wheels 32 rotate about substantially parallel axes, and it is contemplated that such rotational axes may be substantially aligned with each other. By generally centering the drive wheel assemblies 20a, 20b longitudinally along the AGV and laterally spacing the drive wheels 32 generally equally from the longitudinal center line CL (FIG. 12) of the AGV, the drive wheels may be driven by a differential drive system to both propel and steer the AGV of over the ground surface, such as to be capable to spinning or turning with a generally zero-turn radius. The illustrated drive wheel assemblies 20a, 20b each have a separate electric drive motor 33 and corresponding encoder that is supported at the corresponding swing arm to directly attach to the supported drive wheel 32.

Figure 14:
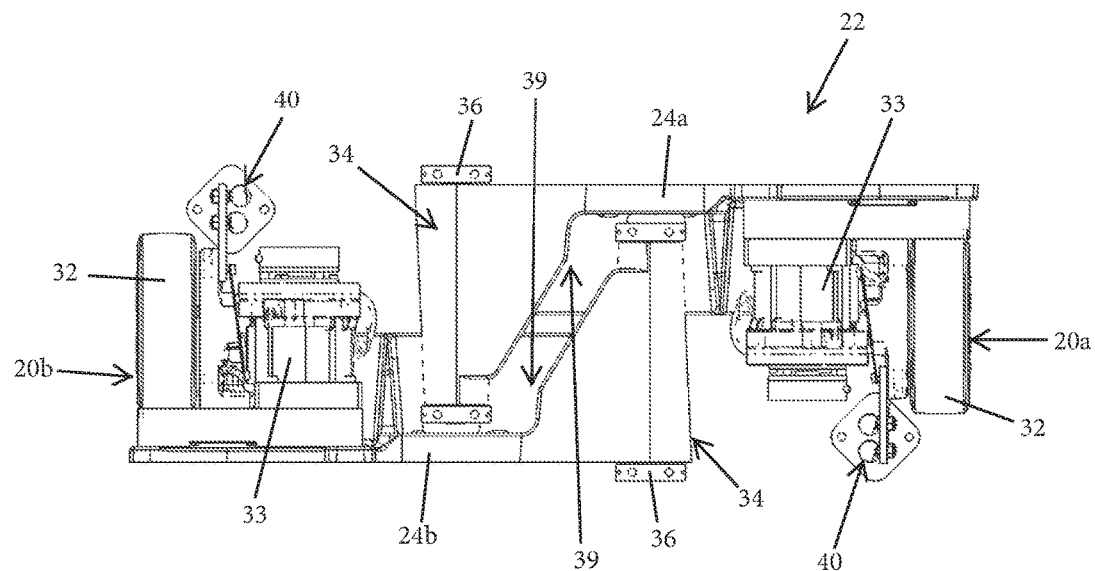
FIG. 14 is a bottom plan view of the suspension system and wheel assemblies shown in FIG. 13.
Figure 15:
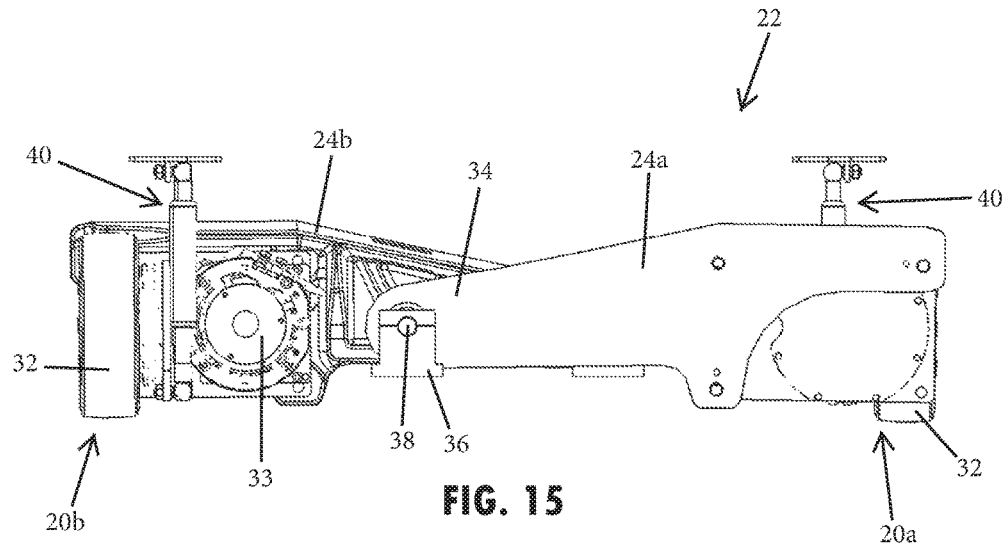
FIG. 15 is an end elevational view of the suspension system and wheel assemblies shown in FIG. 13.
Figure 16:
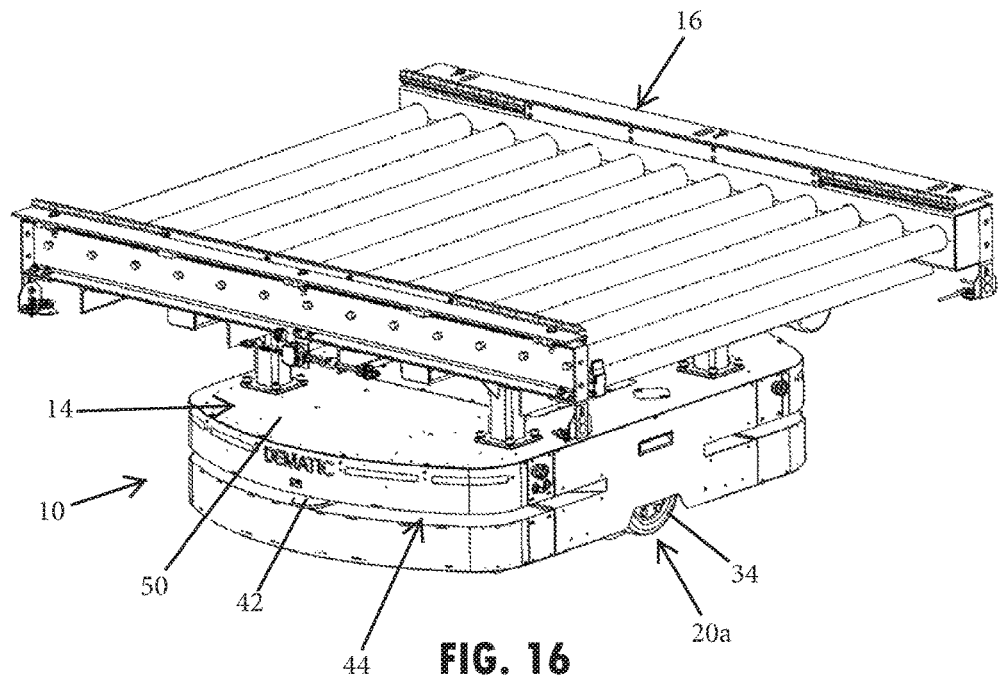
FIG. 16 is an upper perspective view of the automated guided vehicle of FIG. 1, having a roller conveyor module mounted on the automated guided vehicle.
Figure 17:
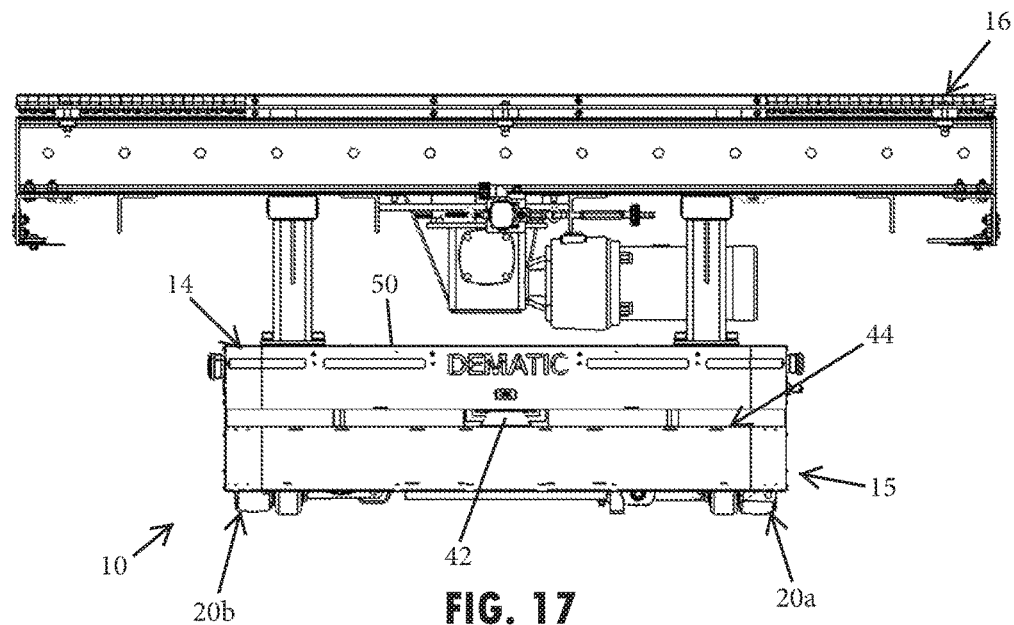
FIG. 17 is an end elevational view of the automated guided vehicle shown in FIG. 16.
Figure 18:
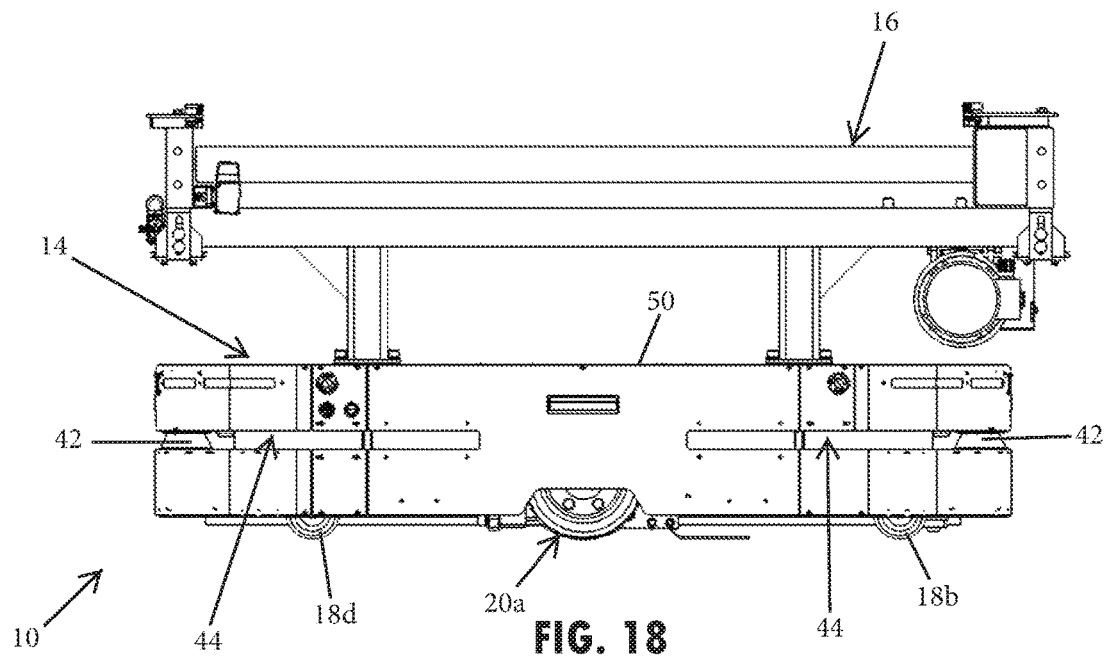
FIG. 18 is a side elevational view of the automated guided vehicle shown in FIG. 16.
Figure 19:
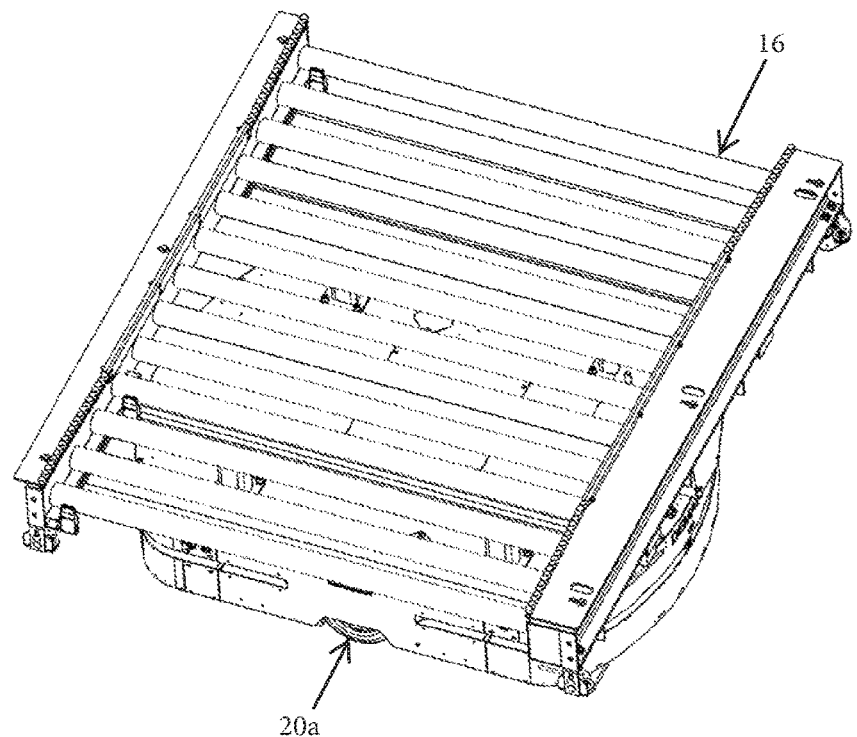
FIG. 19 is a top perspective view of the automated guided vehicle shown in FIG. 16.

The AGV 10 may have a suspension system 22 for the drive wheel assemblies 20a, 20b so as to bias the drive wheel assemblies 20a, 20b against the ground surface to maintain friction of the drive wheels 32 against the ground surface, such as for creating the necessary friction to move heavy loads and to allow the drive wheels 32 to maintain contact with the ground surface when the AGV traverses uneven ground surfaces, such as transitions to or from sloped surfaces with upward or downward inclines. As shown in FIGS. 9-15, the suspension system 22 is provided with intersecting swing arms 24a, 24b that pivotally mount at the base frame structure 12 and independently attach at each of the drive wheel assemblies 20a, 20b. The intersecting swing arms 24a, 24b each include a pivotal end 34 that pivotally attaches at the base frame structure 12, such as about a pivot bracket 36 that supports a shaft 38 extending through the pivot end 34 of the swing arms to effectuate the pivotal movement of the swing arms. Thus, the shaft 38 may define a pivot axis PA, such as shown in FIG. 12. The pivotal ends 34 are attached on opposing sides of the base frame structure 12 from the drive wheel assembly supported at the respective swing arm, such that intermediate sections of the swing arms overlap and/or intersect at an offset or spaced distance from each other. Thus, the swing arms may be intersecting when viewed from a front or rear end of the AGV, such as shown in FIG. 15, and/or may be overlapping when viewed from a top or bottom of the AGV, such as shown in FIG. 14. To provide the overlapping and intersecting arrangement, the illustrated swing arms 24a, 24b have a recessed area 39 at the intermediate sections of the swing arms between the pivotal ends and the supported wheel assemblies, as shown in FIG. 14. By overlapping and intersecting the swing arms 24a, 24b, the drive wheels are nearly or substantially aligned axially and the length and corresponding moment arm of each swing arm is longer than half of the lateral width of the AGV, which has the effect of reducing the lateral tipping of the drive wheels and thus preventing uneven wear of the drive wheels.

The suspension system also includes a spring component 40 disposed between each of intersecting swing arms 24a, 24b and the base frame structure 12 at or near the respective drive wheel 34 for providing a downward biasing force. As illustrated, the spring component 40 is a gas spring that is configured for loads expected for operating the material handling apparatus. It is also contemplated that the spring component may be a mechanical spring, such as a helical spring that is designed to provide compressive forces to the wheel assemblies. In cooperation with the pivotal connection of the swing arms, the spring components are configured to provide a vertical travel for the pair of drive wheels 32 that extends below the casters a distance that maintains the pair of drive wheels in contact with the ground surface when the ground surface that the AGV is traveling over is uneven, such as to accommodate at least about a 5% change in include or otherwise a change in slope of about 3 degrees. It is understood that the preferred vertical travel for the drive wheels in additional embodiments may be increased or decreased to accommodate the desired potential terrain conditions.

Referring again to FIGS. 1-6, the peripheral sensory system of the AGV is integrated into the structural frame 12 so as to be able to utilize two sensors 42 to monitor the peripheral area or sensory field 11 surrounding the AGV, without interfering with or protruding above the upper portion or surface 14 of the AGV. The base frame structure 12 includes intermediate horizontal slots 44 at each opposing longitudinal end of the base frame structure 12. The intermediate horizontal slots 44 are each disposed at the vertical support members 48 between upper and lower portions or surfaces 14, 15 of the base frame structure 12 for permitting two horizontally directed sensor fields 46a, 46b of the navigation and guidance system to substantially surround the AGV 10. The illustrated sensors 42 each include a directional sensor, such as a LIDAR sensor, that scans its respective sensor field 46a, 46b and each preferably have a coverage greater than 180 degrees in a substantially horizontal plane, and more preferably a coverable of greater than about 250 degrees in a substantially horizontal plane, and yet more preferably a coverable of about 270 degrees in a substantially horizontal plane. The directional sensors may also or alternatively comprise optical sensors, proximity sensors, positional sensors, and the like. The sensors 42 are attached at support posts 54 (FIG. 9) disposed at each opposing longitudinal end of the base frame structure 12 for each to emit its sensor field 46a, 46b though the intermediate horizontal slot 44, such that the sensor fields overlap to form overlapping sensor fields 46c at the lateral peripheral areas of the AGV near the drive wheel assemblies 20a, 20b. The overlapping sensor fields 46c near the drive wheels, such that there may be at most a relatively small triangular area that is not part of the peripheral sensory field 11 that is located immediately adjacent the drive wheels, such as preferably extending laterally less than about twice the diameter of the drive wheel 34.

As further shown in FIGS. 7-11, the horizontal slots 44 are at least partially disposed in internal structural members of the base frame structure 12, such as in the vertical or upright support walls 48 that extend between upper and lower plates 50, 52 of the base frame 12. The lower plate 52 includes caster housings 56 that receive the casters 18a, 18b, 18c, 18d that support the AGV. The vertical wall members 48 and other support structures may extend upward from the lower plate 52 within the area not affected by the horizontal slots 44 with sufficient stability to support the upper plate 50 so that it may support the desired material handling apparatus. The upper plate 50 may have a standard bolt pattern or other connection feature that allows multiple different material handling apparatuses to be separately attached to the AGV, so as to allow for a desired material handling apparatus to be selected and modularly attached to the AGV for the desired operation to be performed by the AGV.

Thus, the AGV 10 has a body structure 12 with a flat top surface 14 that is free from obstructions to accommodate a loaded object or an interchangeable material handling device or apparatus at the central attachment area, such as a conveyor platform or a robotic arm. The interchangeable material handling devices or apparatus may be interchangeable due to the common bolt pattern at the central attachment area. To keep the top surface 14 free from obstruction, the vision system or laser scanners 42 that are used for detecting obstacles and/or navigating the AGV are located on the vehicle structure below the top surface 14. It is desirable to use fewer scanners, as the use of more scanners increases the processing demands for the vision system and overall cost.

As illustrated, the body structure 12 of the AGV 10 is designed with a horizontal cutout or slot 18 at each end of the AGV. A scanner 42 is positioned at a central location in each slot 44 at the front and rear ends of the vehicle 10. With each scanner 42 as a center point, the slots 44 each extends about 270 degrees to a point that aligns with or near the edges of the drive wheels 32. Thus, the two scanners 42 have overlapping fields that together provide a 360 degree field surrounding the AGV 10, with the only blind spots being at a relatively small area outside the drive wheels 32.

In general, the AGV may have at least three caster wheels that are provided to support the body structure of the AGV away from the floor, where at least one drive wheel is biased against the floor to propel the AGV. The illustrated caster wheels 18*a*, 18*b*, 18*c*, 18*d* are each mounted in a wheel housing 56 that attaches at a floor panel or lower plate 52 of the frame structure 12. At least one of the caster wheels is positioned on opposing sides of the central drive wheels 34, such that the weight provided by the AGV and any attachment or loaded object is entirely or at least primarily supported by the caster wheels. The central drive wheels 34 are each attached at an overlapping swing arm 24*a*, 24*b* that biases the drive wheels 34 downward against the floor to provide adequate friction for propelling the AGV. The suspension system also maintains the drive wheels 34 in contact with the floor surface when driving over ramped inclines or declines, thereby accommodating for changes in the slope of the floor surface. The amount of downward force provided at each drive wheel 34 can be adjusted by provided more or fewer or differently rated spring components, which can be accessed at top panel caps 51 (FIG. 1). The overlapping swing arm suspension is configured to allow for increased overall length of each swing arm 24*a*, 24*b*, which reduces the amount of potential lateral wheel tilt. Wheel tilt is generally undesirable, as tilting the drive wheels 34 can cause them to wear unevenly and provide inconsistent wheel rotation measurements when attempting to precisely maneuver the AGV.

Figure 20:
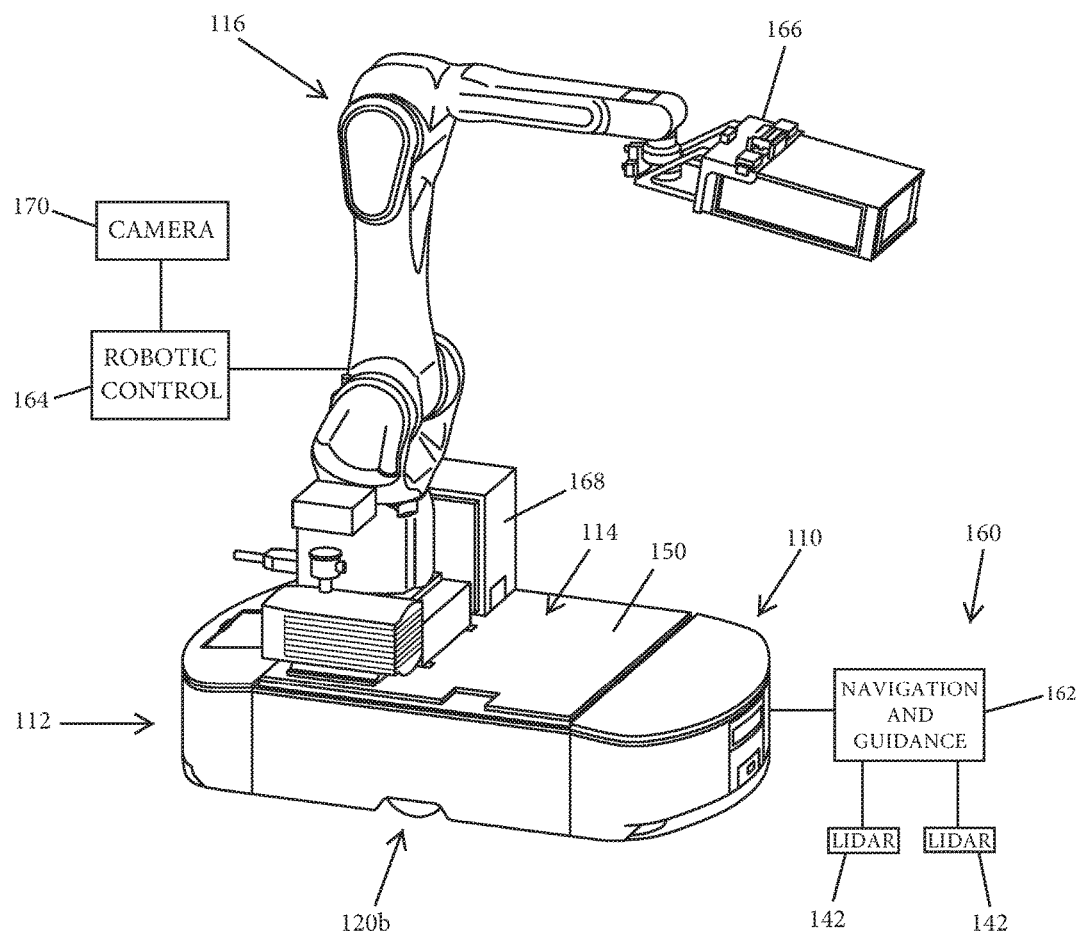
FIG. 20 is a perspective view of an automated guided vehicle having a robotic picking module mounted on the automated guided vehicle, in accordance with an additional embodiment of the present invention.
Figure 21:
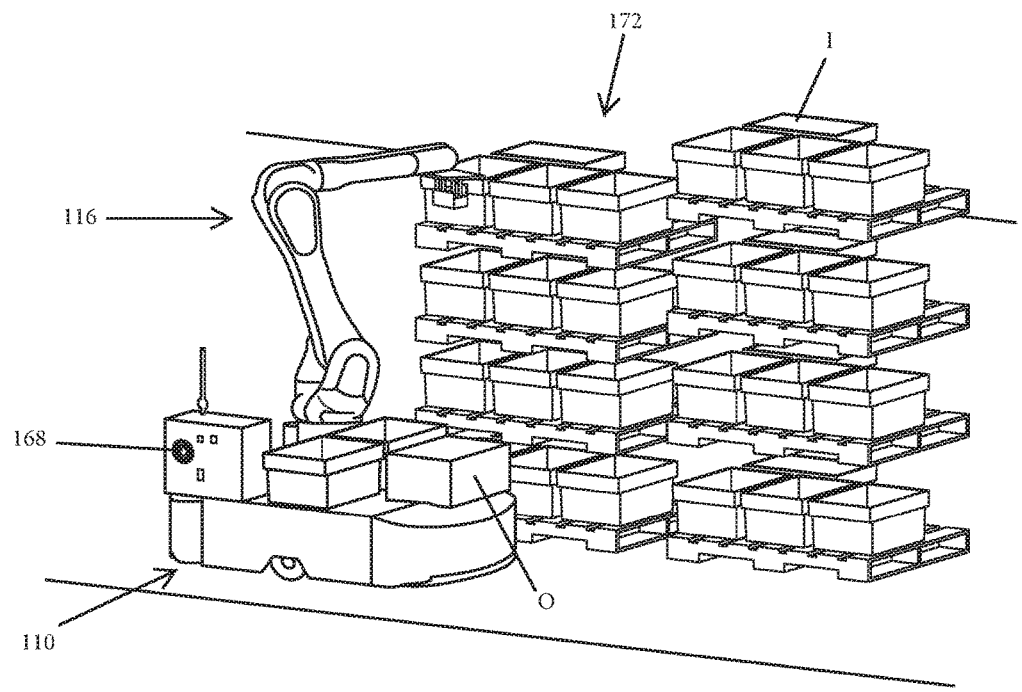
FIG. 21 is a perspective view of the automated guided vehicle of FIG. 20, showing the base of the automated guided vehicle used to support and transport articles.
Figure 22:
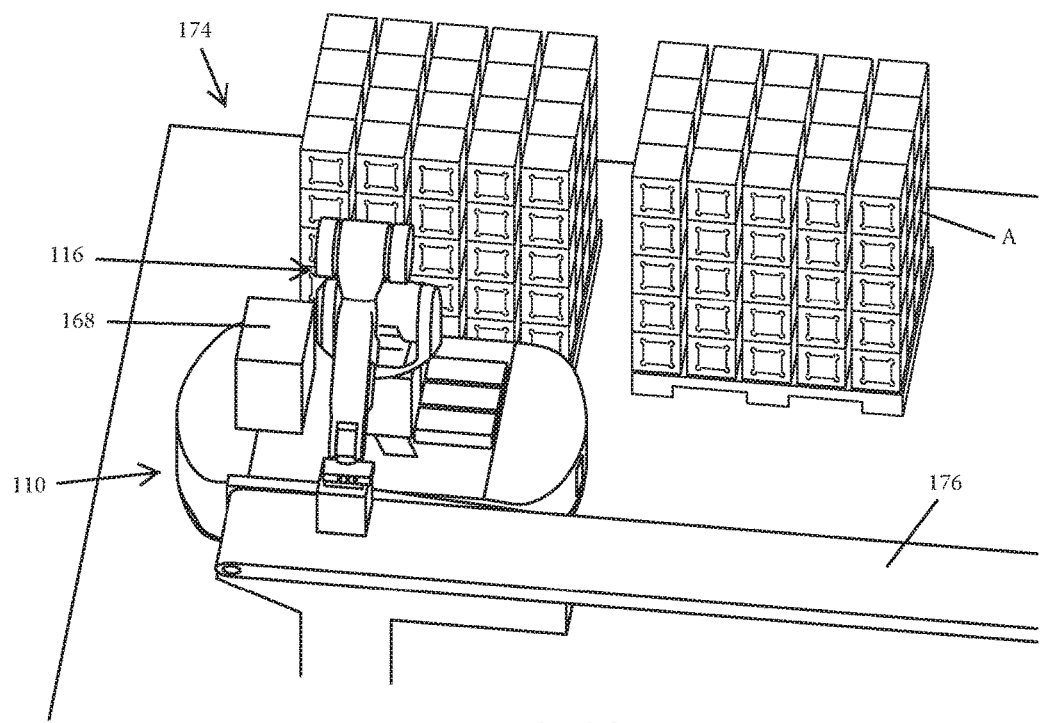
FIG. 22 is a perspective view of the automated guided vehicle of FIG. 20, showing the robotic picking module loading the articles onto a separate conveying mechanism.

Referring now to the AGV 110 shown in FIGS. 20-22, a robotic arm 116 is mounted or otherwise integrated with an upper portion 114 of the base structure 112 of the AGV 110. While the robotic picking apparatus 10 is capable of various applications, it is particularly useful in carrying out the various techniques disclosed in commonly assigned International Patent Application Publication No. WO 2015/035300 entitled AUTONOMOUS MOBILE PICKING, the disclosure of which is hereby incorporated herein by reference in its entirety. The AGV 110 has a propulsion system to propel and steer the AGV. An AGV control 160 includes a navigation and guidance system 162, which is capable of determining precisely the position and orientation of AGV 110 and controlling the position and orientation of the AGV 110 to follow a preferred trajectory, also known as a guide-path. The control 160 includes forward-facing and rearward-facing light imaging, detection and ranging (LIDAR) systems 142 in order to detect features around AGV 110 and direction and distance to the features. The LIDARs 142 are used both to establish a guide-path and to navigate the AGV 110 with respect to the guide-path so that the AGV control 160 can guide movement of the vehicle. As will be set forth in more detail below, LIDARs 142 are capable of detecting the presence of obstacles and humans and responding to both. LIDARs 142 are commercially available from various sources, such as Navatec. Mapping software, which is commercially available, is responsive to the LIDARs in order to establish a topographical map of objects around AGV 110.

The robotic arm 116 is supported from the base 112 and is controlled by a robotic control 164. The robotic arm 116 has an end of arm tool 166 that may be used to grasp and manipulate articles and is interchangeable with other tools at a tool changing station 168 that is supported by base deck or plate 150 of the base structure 112. The robotic control 164 includes a vison system, such as a camera 170, that detects objects to allow end of arm tool 166 to grasp and manipulate the objects. The robotic control 164 is substantially autonomous with respect to the AGV control 160. Both the AGV 110 and the robotic arm 116 can be operated autonomously or in response to instructions received from a central off-vehicle control (not shown), such as by RF or other forms of communication. By having the robotic control 164 be autonomous from the AGV control 160, the process of picking and placing an article is separated from the process of positioning the robotic arm at a location where the picking and placing can occur.

An exemplary picking method 172 is illustrated in FIG. 21. Inventory or donor receptacles, such as totes I, are stored on supports, such as pallets, racks, or the like. The robotic arm 116 picks a tote I having an inventory item needed for a customer order and places the tote on the base deck 150. The robotic arm 116 then picks one or more inventory items from the tote and places the item(s) in order receptacles, such as tote O, which may include one or more orders for a customer and are also carried by base deck 150. If necessary, the end of arm tool 166 may be changed at the tool changing station 168 in order to have a tool that is most useful for a particular operation, such as manipulating a tote I, picking up an inventory item, or the like. When the customer orders are picked, the AGV 110 can transport the order totes O to a pick wall or pack station for completion of the orders. Alternatively, the inventory items may be collected in order receptacles on towed vehicles or separate AGVs as disclosed in the WO '300 publication referred to above.

An alternative picking method 174 is illustrated in FIG. 22. Full cases of articles, referring to as A are picked from a support, such as a pallet, rack, or the like, by the robotic arm 116 after the AGV 110 has positioned the robotic arm adjacent to the full cases. The robotic arm 116 then places the article A on a conveyor 176 where the case is transported to a palletizer or other packing process. Alternatively, the cases may be conveyed by being collected on towed vehicles or separate AGVs as disclosed in the WO '300 publication referred to above.

Figure 23:
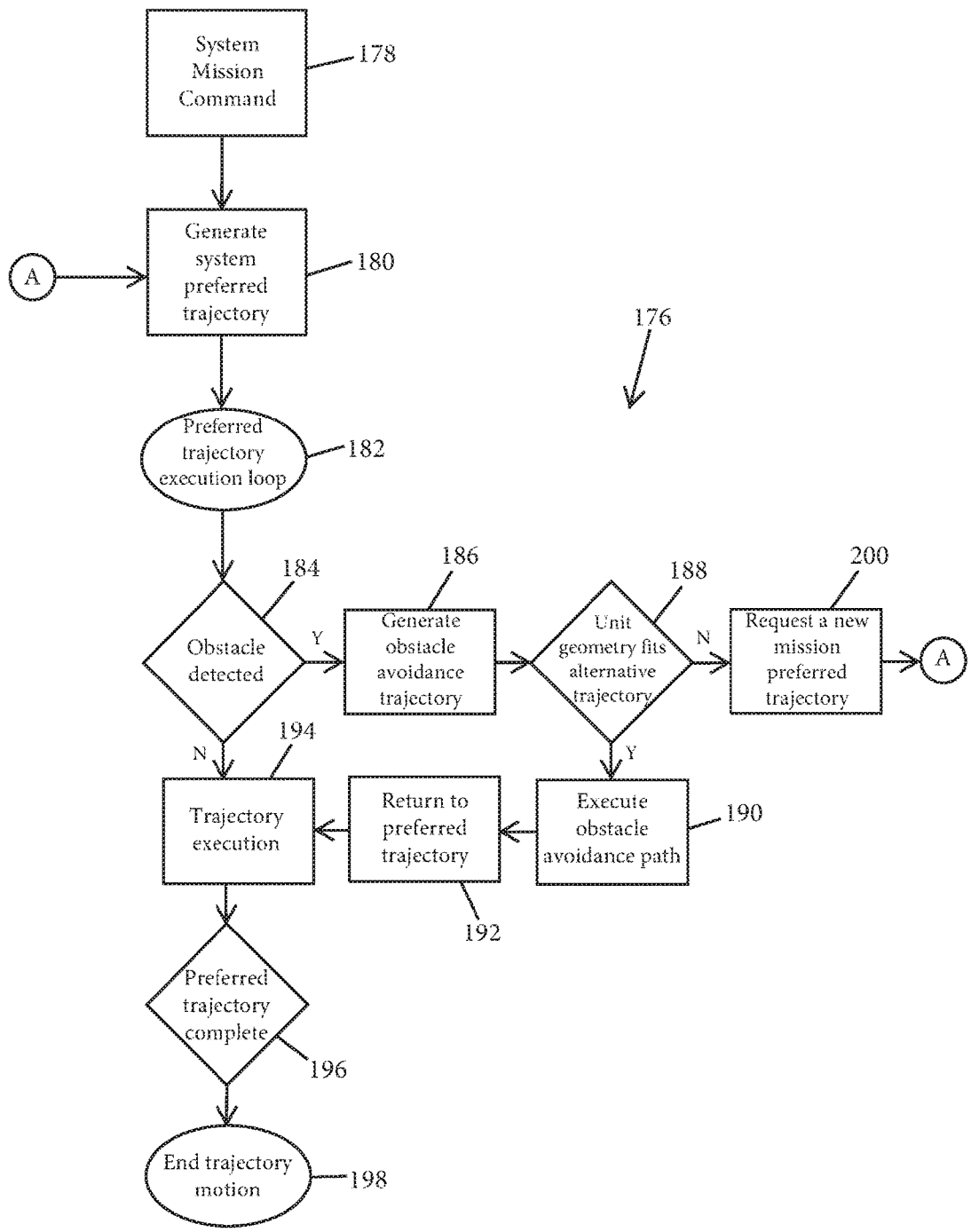
FIG. 23 is a flow diagram of a controlled obstacle avoidance technique.

The AGV 110 is capable of carrying out a controlled obstacle avoidance technique 176, such as shown in FIG. 23. In response to a system mission command 178 issued by a central control that is either stationary, such as a warehouse management system, or an autonomous feature of AGV control 160, a preferred trajectory, such as a guide path, 180 is generated, such as with navigation and guidance system 162. The guide-path is traveled by performance of a trajectory execution loop 182 until an obstacle 184 is detected. When the obstacle is detected, navigation and guidance system 162 generates a detour trajectory at 186 which will return to the preferred trajectory, or guide path, such as by measuring clearance on both sides of the obstacle using LIDARs 142 and determines at 188 if the AGV fits the alternative trajectory. If it is determined at 188 that that the geometry of vehicle 110 fits the detour trajectory, such as by clearance on one of the sides being sufficient to guide AGV 110, then a detour path is followed at 190. Since the detour guide-path is calculated to return to the preferred trajectory, such as the original guide-path, the detour guide-path is followed at 192 which will return vehicle 110 to the original trajectory which will result in the original trajectory again being followed at 194 until it is completed at 196 and the vehicle stops at 198. If it is determined at 188 that a detour trajectory cannot be calculated that avoids all obstacles and returns the vehicle to the preferred trajectory, a new mission trajectory, or alternate route, is requested at 200 from the central control and the method returns to following the alternate route at 180.

Figure 24:
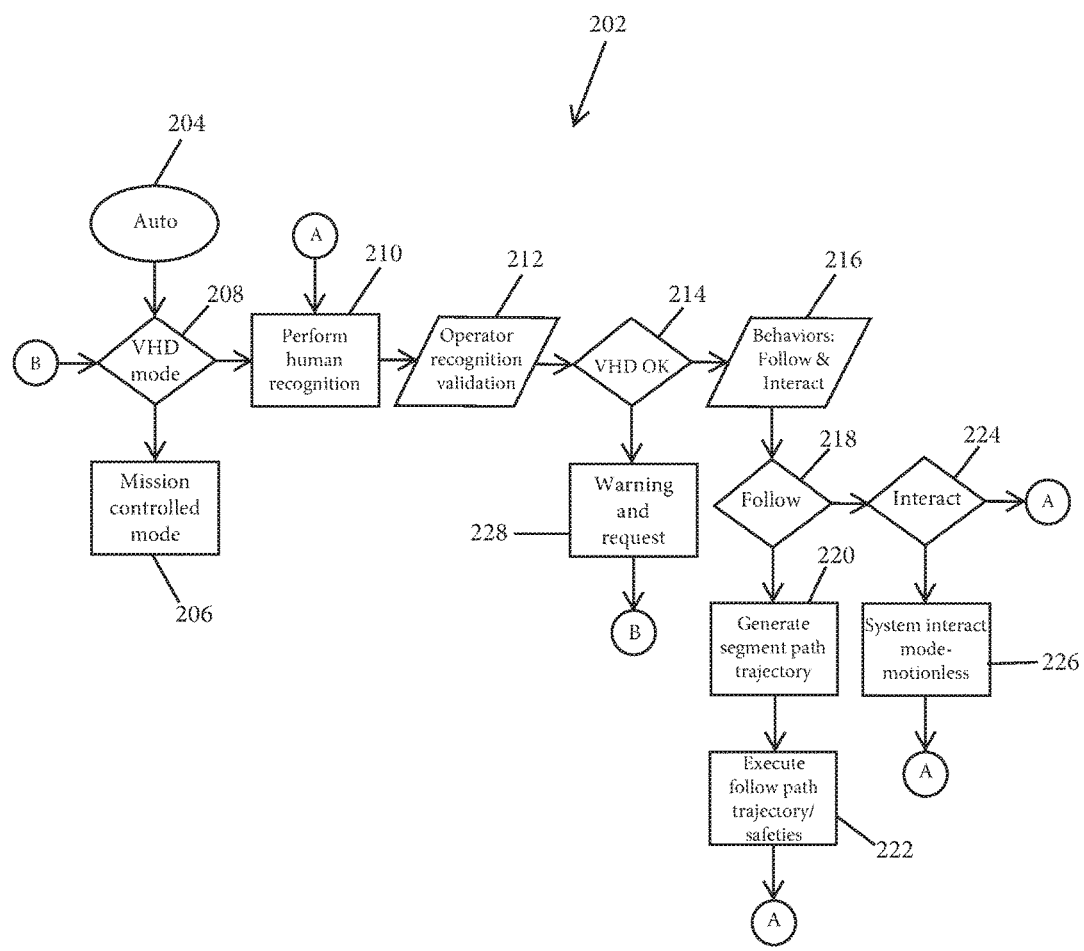
FIG. 24 is a flow diagram of a vehicle human detection, follow, and interact technique.

The AGV 110 may also or alternatively be capable of carrying out a human detection and following technique 202 illustrated in FIG. 24. Technique 202 may begin with AGV control 160 being in an autonomous mode at 204 from which it determines whether a vehicle human detection (VHD) mode 208 is selected. If not, then a standard mission controlled mode is carried out at 206 in which the AGV control follows a preferred trajectory. If it is determined at 208 that the VHD mode is selected, then AGV control 160 begins at 212 to verify whether an object detected is a human using known detection algorithms and, if it is determined at 214 that a human was verified, then the AGV control begins to follow and/or interact with the human at 216. If the technique is intended to follow the human at 218, then a segment path trajectory is generated at 220 that follows the human and the path is followed at 222. If it is determined at 218 that the technique is not intended to follow the human, then it is determined at 224 whether it was intended to interact with the human. If so, the system interact mode is carried out at 226 and the AGV is made to be still or motionless. The interact mode is useful for the robotic arm to pick an item pointed to by the human, put away an item to a location designated by the human or to dispose of an item picked by the human. Other examples with be apparent to the skilled artisan.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. An automated guided vehicle (AGV) configured to operate with a navigation and guidance system, said AGV comprising:
   a base frame configured to support a material handling apparatus;
   a plurality of support wheel assemblies attached at peripheral portions of the base frame and configured to movably support the base frame away from a ground surface;
   a pair of drive wheel assemblies disposed between at least two of the plurality of support wheel assemblies and configured to propel the AGV over the ground surface; and
   a suspension system having intersecting swing arms that pivotally mount at the base frame and independently attach at each of the drive wheel assemblies, wherein the suspension system is configured to bias the pair of drive wheel assemblies against the ground surface to maintain friction of the drive wheel assemblies against the ground surface.

2. The AGV of claim 1, wherein the pair of drive wheel assemblies includes spaced apart drive wheels that are configured to rotate about substantially parallel axes.

3. The AGV of claim 2, wherein the spaced apart drive wheels are driven by a differential drive system to propel and steer the AGV of over the ground surface.

4. The AGV of claim 1, wherein the plurality of wheel assemblies comprises a caster.

5. The AGV of claim 1, wherein the intersecting swing arms each include a pivotal end that attaches at the base frame on opposing sides of the base frame from the drive wheel assembly supported at the respective swing arm.

6. The AGV of claim 5, wherein the spring component comprises a gas spring that is configured for loads expected for operating the material handling apparatus.

7. The AGV of claim 1, wherein the suspension system includes a spring component disposed between each of intersecting swing arms and the base frame at or near the respective one of the pair of drive wheel assemblies for providing a downward biasing force.

8. The AGV of claim 1, wherein the suspension system is configured to provide a vertical travel for the pair of drive wheels that extends below the plurality of support wheel assemblies a distance that maintains the pair of drive wheels in contact with the ground surface when the ground surface that the AGV is traveling over is uneven.

9. The AGV of claim 1, wherein the pair of drive wheel assemblies each include an electric drive motor supported at the respective one of the intersecting swing arms and operably coupled with a corresponding drive wheel.

10. The AGV of claim 1, wherein the intersecting swing arms include (i) a first arm that has a pivotal end coupled with the base frame and a distal end couple with a first wheel assembly of the pair of wheel assemblies and (ii) a second arm that has a pivotal end coupled with the base frame and a distal end coupled with a second wheel assembly of the pair of wheel assemblies, and wherein the pivotal ends of the first and second arms are attached with the base frame at opposing lateral sides of the base frame.

11. The AGV of claim 1, wherein the base frame includes an intermediate horizontal slot at each opposing longitudinal end of the base frame, and wherein the intermediate horizontal slots are each disposed between upper and lower surfaces of the base frame for permitting two horizontally directed sensor fields of the navigation and guidance system to surround the AGV.

12. The AGV of claim 1, wherein a LIDAR sensor is disposed at each opposing longitudinal end of the base frame for each emitting a sensor field though an intermediate horizontal slot disposed in the base frame below an upper surface thereof, and wherein the sensor fields of the LIDAR sensors together substantially surround a periphery of the AGV.

13. The AGV of claim 1, wherein a material handling apparatus is mounted at an upper portion of the base frame.

14. The AGV of claim 13, wherein the material handling apparatus comprises a robotic arm.

15. The AGV of claim 13, wherein the material handling apparatus comprises a powered conveyor bed.

16. The AGV of claim 1, wherein a robotic picking arm is mounted at an upper portion of the base frame and has a robotic control that is operable to cause the robotic picking arm to interact with a human.

17. The AGV of claim 16, wherein the pair of drive wheel assemblies are operable with the navigation and guidance system of the AGV to propel and steer the AGV to follow a human.

18. A method of propelling an automated guided vehicle (AGV) over a ground surface, said method comprising:
   having a base frame that includes a plurality of support wheels attached at peripheral portions of the base frame to movably support the base frame away from the ground surface;
   rotating a pair of drive wheels that are disposed between at least two of the plurality of support wheels and for engaging the ground surface to propel the AGV; and biasing the drive wheels against the ground surface with a suspension system that has intersecting swing arms pivotally mount at the base frame and independently supporting each of the drive wheels, wherein a biasing downward force of the suspension system maintains friction of the drive wheels against the ground surface.

19. A drive wheel suspension assembly for an automated guided vehicle (AGV) that has a base frame supported by a plurality of support wheels, said drive wheel suspension assembly comprising:
first and second drive wheels spaced apart and configured to be disposed between at least two of the plurality of support wheels for propelling the AGV over a ground surface;
first and second swing arms that intersect and attach at the drive wheel assemblies; and
wherein the first and second swing arms are configured pivotally mount at the base frame to bias the first and second drive wheels against the ground surface to maintain friction.

20. An automated guided vehicle (AGV) comprising:
a base frame having an upper portion configured to support a material handling apparatus;
a propulsion system adapted to propel the base frame;
first and second directional sensors disposed at opposing ends of the base frame and each operable to emit a sensor field within at least one slot disposed between the upper portion and a lower portion of the base frame, wherein the base frame includes a plurality of support members extending between the upper and lower portions of the base frame, and wherein the at least one slot is disposed in the plurality of support members; and
wherein the sensor fields of the first and second directional sensors each comprise horizontal coverage of at least 180 degrees and are arranged to provide a combined sensor field surrounding the AGV.

21. The AGV of claim 20, wherein the first and second directional sensors each comprise a LIDAR sensor.

22. The AGV of claim 20, wherein a plurality of support wheels are attached at the lower portion of the base frame and configured to movably support the base frame away from a ground surface.

23. The AGV of claim 22, wherein the propulsion system comprises a pair of drive wheels disposed between at least two of the plurality of support wheels and driven by a differential drive system.

24. The AGV of claim 22, wherein the propulsion system includes at least one drive wheel disposed between at least two of the plurality of support wheels and a suspension component biasing the at least one drive wheel downward against the ground surface.

25. The AGV of claim 24, wherein the suspension component comprises a gas spring that is configured for loads expected for operating the material handling apparatus.

26. The AGV of claim 20, wherein the propulsion system includes intersecting swing arms that each include a pivotal end that attaches at the base frame on opposing sides of the base frame from a drive wheel supported at each of the intersecting swing arms.

27. The AGV of claim 20, wherein the sensor fields of the first and second directional sensors each comprise coverage greater than 250 degrees.

28. The AGV of claim 20, wherein a material handling apparatus is mounted at the upper portion of the base frame.

29. The AGV of claim 28, wherein the material handling apparatus comprises a robotic arm.

30. The AGV of claim 28, wherein the material handling apparatus comprises a conveyor bed.

31. The AGV of claim 20, wherein the first and second directional sensor are operable with at least one of a safety system and a navigation and guidance system to control the propulsion system of the AGV.

32. A method of operating an automated guided vehicle (AGV), said method comprising:
providing a base frame having an upper portion supporting a material handling apparatus and a lower portion supported by a plurality of wheel assemblies configured to support the base frame away from a ground surface;
moving the base frame over the ground surface to a desired location with a propulsion system comprising at least one of the plurality of wheel assemblies; and
monitoring a perimeter sensory field surrounding the base frame with two directional sensors that are disposed at opposing ends of the base frame, wherein the two directional sensors are each operable to emit a sensor field within at least one slot disposed at support members extending between the upper and lower portions of the base frame.

33. An automatic guided vehicle (AGV) comprising:
a base frame having a propulsion system;
an AGV control comprising a navigation and guidance system;
a robotic picking arm mounted to the base frame and a robotic control controlling movement of the robotic picking arm; and
wherein the AGV control and the robotic control are autonomous and wherein the navigation and guidance system is operable to cause said propulsion system to follow a human.

34. The AGV of claim 33, wherein the robotic control is operable to cause the picking arm to interact with the human.

35. The AGV of claim 34, wherein the navigation and guidance system causes the AGV to be motionless when the picking arm is interacting with the human.

36. The AGV of claim 33, wherein the AGV control is adapted to establish a preferred guide-path and control the propulsion system to travel along the preferred guide-path, and wherein the AGV control is adapted to detect an obstacle on the guide-path, determines if a detour path is available around the obstacle that returns the AGV to the preferred guide-path, and travels the detour path and returns to the preferred guide-path if the detour path is available.

* * * * *

UNITED STATES PATENT AND TRADEMARK OFFICE
CERTIFICATE OF CORRECTION

PATENT NO. : 10,434,924 B2
APPLICATION NO. : 15/699275
DATED : October 8, 2019
INVENTOR(S) : Rene D. Alfaro et al.

Page 1 of 1

It is certified that error appears in the above-identified patent and that said Letters Patent is hereby corrected as shown below:

In the Specification

Column 8, Line 42, "traveled" should be --travelled--

In the Claims

Column 9, Claim 2, Line 60, delete "substantially"

Signed and Sealed this
Tenth Day of November, 2020

Andrei Iancu
*Director of the United States Patent and Trademark Office*